United States Patent
Stoler et al.

(10) Patent No.: US 10,078,568 B1
(45) Date of Patent: Sep. 18, 2018

(54) DEBUGGING A COMPUTING DEVICE

(71) Applicant: AMAZON TECHNOLOGIES, INC., Seattle, WA (US)

(72) Inventors: Gil Stoler, Nofit (IL); Yaniv Shapira, Bet Itzhak (IL)

(73) Assignee: Amazon Technologies, Inc., Seattle, WA (US)

( * ) Notice: Subject to any disclaimer, the term of this patent is extended or adjusted under 35 U.S.C. 154(b) by 146 days.

(21) Appl. No.: 14/954,780

(22) Filed: Nov. 30, 2015

(51) Int. Cl.
  *G06F 11/00* (2006.01)
  *G06F 11/263* (2006.01)
  *G06F 11/22* (2006.01)

(52) U.S. Cl.
  CPC ........ *G06F 11/263* (2013.01); *G06F 11/2205* (2013.01)

(58) Field of Classification Search
  USPC .......................................................... 714/33
  See application file for complete search history.

(56) References Cited

U.S. PATENT DOCUMENTS

| | | | | |
|---|---|---|---|---|
| 5,469,451 A * | 11/1995 | Henmi | ................ | G06F 11/1052 714/766 |
| 5,561,761 A * | 10/1996 | Hicok | ................ | G06F 11/3656 714/30 |
| 6,185,731 B1 * | 2/2001 | Maeda | ................ | G06F 11/3636 703/28 |
| 6,601,192 B1 * | 7/2003 | Bowman-Amuah | ........................ | G06F 11/3688 714/38.12 |
| 7,577,876 B2 * | 8/2009 | Boyce | ................ | G06F 11/2236 714/37 |
| 2006/0248391 A1 * | 11/2006 | Glover | ................ | G06F 11/3648 714/30 |
| 2007/0006042 A1 * | 1/2007 | Beukema | ............ | G06F 11/3656 714/38.1 |

* cited by examiner

*Primary Examiner* — Amine Riad
(74) *Attorney, Agent, or Firm* — Blank Rome LLP (57) ABSTRACT

A system includes a host debugger to carry out a debugging flow on a computing device and a debug controller to couple the host debugger to the computing device. The debug controller receives a bit stream from the host debugger, converts the incoming bit stream into a command according to a protocol, determines whether the command is a first-stage read command or a second-stage read command, and issues the first-stage read command to a data path of the computing device. If the command is a second-stage read command, the debug controller causes a reservation register of the debug controller to provide a data value or status indication to the host debugger through the interface. The reservation register contains read data returned by the first-stage read command and, in response to the second-stage read command, provides a status indication when the first-stage read command has not yet returned read data.

20 Claims, 4 Drawing Sheets

DEBUGGING A COMPUTING DEVICE

BACKGROUND

Integrated circuits often may need to be debugged, even once already in production or integrated into an end-use computing device, for example because the integrated circuit fails to operate as expected. Debugging an integrated circuit once in production may involve configuring or interrogating various resources internal to the integrated circuit, such as memory resources including registers, or other accessible resources that might provide insight for debugging purposes. When the integrated circuit does not operate as expected, internal computing resources such as a central processing unit (CPU) may not be available for debugging purposes, and thus an external access port may be needed. A system on a chip (SoC) is one type of an integrated circuit that integrates multiple components of a computer into a single chip. A SoC may include digital, analog, mixed-signal, and radio-frequency (RF) functions on a single chip substrate. SoCs are advantageously utilized due to their compact size and low power consumption.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different parties may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

In accordance with examples of the present disclosure, a stand-alone debug controller is implemented between a device requiring debugging (e.g., a system on a chip (SoC), a microprocessor, an application-specific integrated circuit (ASIC), a field-programmable gate array (FPGA), or other semiconductor device) and a software layer of a debugging computer system, a specially-designed field-programmable gate array (FPGA) for debugging, or other hardware and/or software combination to control a debugging operation of the device requiring debugging. The debug controller includes a slave interface to interface with the device requiring debugging (i.e., the device acts as the slave), and thus facilitates debugging of the SoC by the software layer of the debugging computer system, for example.

The debug controller receives a stream of bits from the debugging computer system, which may be referred to as a "host debugger" for example, and decodes the incoming bit stream to a set of commands corresponding to read and write operations for internal addresses of the device requiring debugging. In certain examples, the set of commands may include other commands, such as commands to change a mode of operation of the debug controller, by accessing local debug controller resources or controlling flows of the debug controller. For example, changing the mode of operation may include changing parameters of the debug controller, such as changing to a short or extended addressing mode and setting address bars when needed, synchronizing and signaling preload flows of the device requiring debugging, or identifying and authorizing approved debug controllers. In certain cases, the debug controller utilizes a Serial Peripheral Interface (SPI) serial standard interface, or other similar low-cost, low-to-medium speed (e.g., approximately 25-50 MHz) interface. Thus, the debug controller functions as an external access port to access any internally-mapped resource of the device requiring debugging.

The standard SPI protocol interfaces with a device being debugged, such as a SoC in the following exemplary explanation, by enabling an incoming and outgoing bit stream between the SoC and the debug controller. Conventionally, the SPI protocol is a serial "no wait" protocol, and thus when a read command is issued to a location of the SoC, the SPI protocol expects a response in the clock cycle immediately succeeding the clock cycle in which the last bit of the read command was transmitted or pushed to the SoC. In cases where the debug controller issues a read command to access a nearby, or easily accessed, resource of the SoC (e.g., a resource that is within one-byte duration (or 8 SPI bits)), latency is minimal and thus a response may be properly returned and satisfy the "no wait" aspect of the conventional SPI protocol. However, for accessing far (or "over-the-hill") resources of the SoC where one-byte duration cannot be guaranteed or is not known, access latency may be great enough such that the SoC fails to deliver a response to the debug controller in the limited timeframe enforced by the SPI read protocol.

In order to address these and other concerns, and while maintaining a relatively low-cost solution for device debugging, examples of the present disclosure are directed to a debug controller that receives and decodes various commands, including read and write commands directed to internally-mapped resources of a device such as a SoC being debugged. In one example, the commands may include an 8-byte address field, a 4-byte data field (e.g., for a write transaction), and a 2-byte command field, which represents various commands including read and write commands as described above. The debug controller decodes the command by converting the command received from a host debugger. Both the debug controller and the host debugger may include software executing on a computer system, specifically-designed debugging hardware, or a combination of hardware and software. In particular, the debug controller converts the command to an appropriately-formatted command for the SoC. In certain cases, the debug controller utilizes an SPI slave interface to internally connect to the main data paths of the SoC, and acts as a SPI data bus master to drive the various read and write commands as bus transactions to the proper location of the SoC.

As explained above, the conventional SPI protocol suffers from an inability to tolerate latency beyond some minimal amount (i.e., read data must be ready the cycle immediately succeeding the last cycle in which the read command is supplied to the SPI slave). In accordance with various examples, the debug controller implements a two-stage read command protocol to provide an increased latency tolerance. Each read stage or command may be issued consecutively by the host debugger to the debug controller. The first read command is referred to herein as a "read-fetch" command or a "first-stage" read command, in which the debug controller accesses a resource at the internal address location of the SoC identified by the command and brings the data stored at that location into a reservation register of the debug controller. The second read command is referred to herein as a "read-publish" command or a "second-stage" read command, in which the data stored at the reservation register is published out to the interrogating host debugger.

In the event that the debug controller receives a command to read a resource location that corresponds to a nearby resource (i.e., where latency is not an issue), the sequential read-fetch and read-publish commands will result in the data at the resource location being brought into the debug controller reservation register and subsequently published out to the host debugger, for example for subsequent analysis.

However, in the event that the debug controller receives a command to read a resource location that corresponds to an over-the-hill resource (i.e., where latency may cause a failure to deliver a response in the limited timeframe enforced by the conventional SPI read protocol), then the read-fetch command will not initially be successful in bringing the data at the resource location into the debug controller reservation register in a timely manner. In this case, the read-publish command that follows the read-fetch command results in the debug controller reporting an "in-progress" status to the host debugger while no valid data has been brought into the debug controller reservation register.

If the access to the resource location specified by the read-fetch command fails due to a time-out or any other error, then a read-publish command will result in the debug controller reporting a failure status or a status corresponding to such a time-out or other error. Conversely, if the access to the resource location specified by the read-fetch command ends successfully (e.g., before a time-out period has been satisfied), then a read-publish command will result in the data that was brought into the reservation register being published out to the host debugger. That is, regardless of whether the read-fetch command is immediately successful, ultimately unsuccessful, or successful after a period of latency greater than would be tolerated using the conventional SPI protocol, the debug controller is configured to generate a status indicator in response to receiving and decoding a read-publish command, and the status indicator is provided to the host debugger in response to its interrogation by way of issuing a read-publish command.

Although generally described with respect to reading from the SoC, the ability of the debug controller to provide status information in response to decoding a read-publish command may also be leveraged by the host debugger in the context of a prior write command. For example, the host debugger may poll the debug controller by issuing a read-publish command following a write command to prompt the debug controller to provide a status indicating a successful write, a failed write, or that the write operation is still in progress. While a write operation is usually a posted transaction, where once issued the host debugger may continue on to other tasks, knowledge that the write was successful may be useful to the host debugger. For example, since write transactions may target configuration registers, later operation of the device being debugged may be affected by the success or failure of the write operation. Thus, knowledge of success or failure of a write operation may reflect and explain later device behaviors, and so the ability to poll the status of a write command by issuing a read-publish command may be useful in such scenarios.

By providing a debug controller configured to implement a two-part read command structure, where data is first brought from the SoC or computing device being debugged to the controller, and then subsequently published from the debug controller to a host debugger for example, issues associated with latency in reading from a SoC resource are mitigated. Further, the debug controller provides a status indication in response to receiving and decoding a read-publish command that, in addition to mitigating issues associated with latency during a read operation, allows the host debugger to tailor a debugging flow or program to take various actions depending on the status following a read-fetch and/or write operation.

Figure 1:
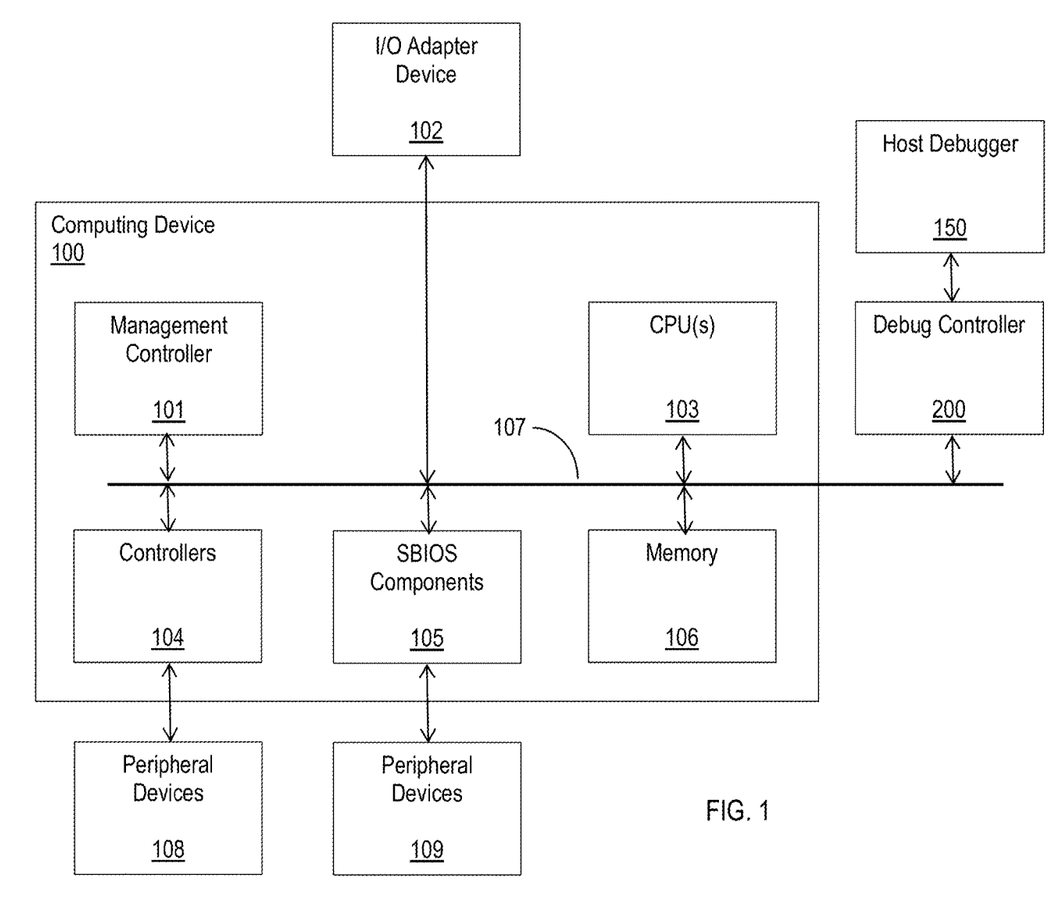
FIG. 1 shows a block diagram of a debug controller interfacing with a computing device being debugged in accordance with various examples of the present disclosure.

Turning now to FIG. 1, a block diagram of a computing device 100 coupled to a host debugger 150 by way of a debug controller 200 is shown in accordance with various examples. As explained above, in one example, the computing device 100 comprises a SoC. The computing device 100 may include a management controller 101 for managing the operation of computing device 100. Specifically, the management controller 101 may include an embedded microcontroller that manages the interface between system management software and computing device 100 components.

An I/O adapter device 102 is in communication with computing device 100. Generally, the I/O adapter device 102 may include any device that inputs and/or outputs data along a communication channel 107, also referred to as a data path of the computing device or SoC 100. The computing device or SoC 100 may also include a System Basic Input/Output System (SBIOS) component 105. The SBIOS component 105 can include non-transitory executable code, often referred to as firmware, which can be executed by one or more processors and used to cause components of the computing device 100 to initialize and identify system devices such as a video display card, audio card, keyboard and mouse, hard disk drive, optical disc drive, and other hardware. The SBIOS component 105 can also include or locate boot loader software that is utilized to boot the computing device 100.

The SBIOS component 105 can be connected to (or in communication with) a number of additional components, such as a central processing unit(s) ("CPU(s)") 103, memory 106 (e.g., RAM), and the like. In one example, such components may be physical computing device resources in communication with other components via the communication channel 107. The communication channel 107 may correspond to one or more communication buses, such as a shared bus (e.g., a front side bus, a memory bus), a point-to-point bus such as a PCI or PCI Express bus, etc., in which the components of the computing device 100 communicate. Other types of communication channels, communication media, communication buses or communication protocols (e.g., the Ethernet communication protocol) may also be utilized.

As will be explained in further detail below, certain examples of the present disclosure utilize a version of communication channel 107 that avoids the need to route parallel data paths for debugging purposes, which may consume a large amount of valuable area on a SoC, for example. To alleviate the potential for collisions on the communication channel 107 (e.g., where a resource that is needed for debugging is blocked because another master such as CPU 103 hangs while accessing that resource), a bus routing protocol such as the Advanced eXtensible Interface (AXI) may be implemented.

The exemplary AXI protocol assigns a unique transaction identification number (ID) to a bus master, such as the CPU 103 and the debug controller 200. Thus, because the debug controller 200 utilizes a unique transaction ID relative to a CPU 103, the debug controller 200 is able to bypass any hanging data path junctions, intersections, and/or resource locations associated with a different transaction ID. Further, the AXI protocol allows a quality of service (QoS) attribute to be assigned to the various bus masters and, in at least some examples, the debug controller 200 is assigned a higher QoS attribute than other bus masters such that debugging flows are given priority over other transactions, such as those which might cause hanging at a data path junction, intersection, or resource location. In the event where the debug controller 200 is accessing a resource and another bus master with a lower QoS attribute attempts to access that same resource, the bus master with the lower QoS attribute may be blocked from accessing that resource.

The computing device components may be in communication with the I/O adapter device 102 by way of the communication channel 107. In addition, although communication channel 107 in FIG. 1 is shown as connecting all of components 101-106 and 200 it should be appreciated that a communication channel in accordance with some examples may connect any subset of the components 101-106 and 200 and/or other components. Importantly, the debug controller 200 interfaces directly with an internal main data path of the computing device or SoC 100, enabling the debug controller 200 to interrogate internal resources of the computing device 100 without requiring additional, area-consuming dedicated debugging data paths or busses.

The computing device 100 may also include one or more controller components 104 for managing hard drives or other forms of memory. An example of a controller component 104 is a SATA hard drive controller.

The computing device 100 may also include additional components that are in communication with one or more of the illustrative components associated with the computing device 100. Such components can include devices, such as one or more controllers 104 in combination with one or more peripheral devices 108, such as hard disks or other storage devices. Additionally, the additional components of computing device 100 can include another set of peripheral devices 109, such as Graphics Processing Units ("GPUs"), or audio processing units.

The debug controller 200, through the data paths 107 of the computing device 100, may access data stored by any such component provided the data is associated with an internal address of the computing device 100. Further, and as will be explained in further detail below with respect to FIG. 2, the debug controller 200 implements a two-stage read command protocol to provide increased tolerance of latency, which may result from accessing a resource of the computing device 100 that is far away from the debug controller 200. When the debug controller 200 decodes a read-fetch command received form the host debugger 150 by way of a serial port (e.g., a SPI serial port), the debug controller 200 accesses a resource at the internal address location of the computing device or SoC 100 identified by the command and brings the data stored at that location into a reservation register of the debug controller 200. When the debug controller 200 decodes a read-publish command received from the host debugger 150 by way of the serial port, for example, the debug controller 200 publishes out the data stored at the reservation register to the interrogating host debugger 150.

Figure 2:
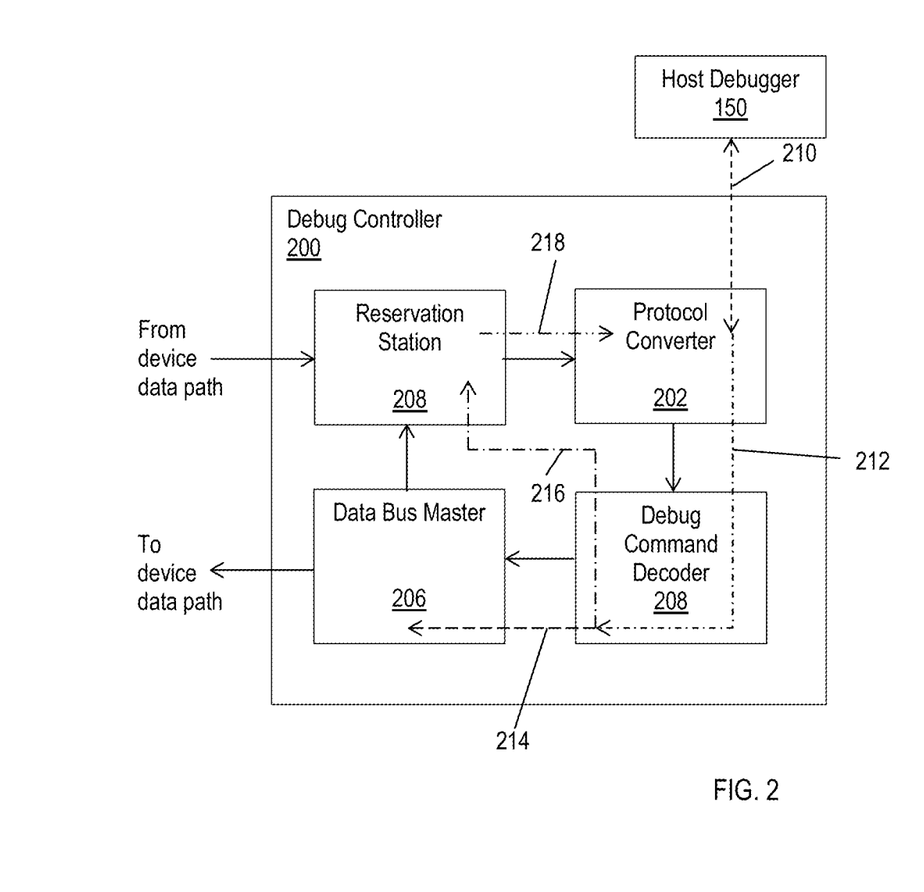
FIG. 2 shows a block diagram of the debug controller of FIG. 1 in further detail and in accordance with various examples of the present disclosure.

Turning now to FIG. 2, components of the debug controller 200 are shown in additional detail in accordance with examples of the present disclosure. The debug controller 200 interfaces with the host debugger (not shown) by way of a serial port, which is coupled to a serial/parallel protocol converter 202 of the debug controller 200. A serial bit stream 210 is sent by the host debugger (e.g., an external microcontroller, a software debugger executing on a standalone computing device, and the like) and is converted by the serial/parallel protocol converter 202 according to, for example, the SPI protocol. Examples of the present disclosure leverage the SPI interface, which is a common interface in many lower-cost devices and SoCs. However, the present disclosure need not be limited to the SPI interface and may use other types of interfaces, such as a Universal Serial Bus (USB) interface, a Management Data Input/Output (MDIO) (also known as Serial Management Interface (SMI)) or other microcontroller serial interface, an Inter-Integrated Circuit (I2C) interface, and the like.

The serial/parallel protocol converter 202 provides the converted command 212 to a debug command decoder 204, which determines whether the command is a read or write command to be provided to the computing device 100 being debugged, or whether the command is a special command having another purpose, such as modifying a mode of operation of the debug controller 200 itself. In one example, the mode of operation of the debug controller 200 may correspond to modifying the address space from 64 bits to 32 bits, shortening the incoming command serial stream by 32 bits, and improving the command throughput as a result of requiring fewer address bits. Such a change to the mode of operation does not limit the ability of the debug controller 200 to access any address space, as it may be that a series of accesses are to a closely grouped or localized address range. Thus, by using a special command for setting the address bar such that the most significant 32 bits will be fixed and later shared by the following access, each access command (e.g., read-fetch or write) specifies only the least significant 32 bits within the address space, which are combined with the fixed most significant bits, resulting in increased command throughput. In the event that the command is one that only affects change to a mode of operation of the debug controller 200, the command terminates locally at the debug controller and the mode of operation is changed or updated. However, if the command is one that is intended for the computing device 100 being debugged (e.g., read, read-fetch, or write), the debug command decoder 204 provides the command to a data bus master 206 shown by data path 214.

The data bus master 206, which may associate a debug controller 200 transaction ID with a particular command in order to implement the AXI bus protocol as explained above, provides the command to the computing device or SoC 100 being debugged by way of the main access data path(s) 107 of the SoC 100. By implementing a bus protocol such as AXI, access arbitration is ensured such that if a bus master that accesses a resource is hanging, the transaction ID of the command being associated with the debug controller 200 will allow the command to be carried out even in the event that the command is directed at a resource that is accessed by a bus master that is hanging.

If the command is a read-publish command, which is directed to the debug controller 200 itself as shown by data path 216, the read-publish command is provided to a reservation register 208. If the data requested is available in the reservation register 208, the reservation register 208 returns or publishes the data back to the serial/parallel protocol converter 202 (along with a status indicating that the data is valid, in at least some cases) as shown by data path 218. The serial/parallel protocol converter 202 then converts the data according to, for example, the SPI interface protocol and provides the data to the host debugger by way of the serial port that couples the debug controller 200 to the host debugger.

However, if the data requested by the read-publish command is not available in the reservation register 208, the reservation register 208 returns to the serial/parallel protocol converter 202 a status indicating that the read request is still in progress also indicated by data path 218, which is subsequently provided to the host debugger. Further, in the event that a time-out or other failure occurs during the attempted read operation, the reservation register 208 returns to the serial/parallel protocol converter 202 a status indicating that a time-out or other failure has occurred, which is subsequently provided to the host debugger.

As a result, in the event that the debug controller 200 receives and decodes a command to read a resource location that corresponds to an over-the-hill resource, then the read-fetch command will not initially be successful in bringing the data at the resource location into the debug controller 200. This latency would violate the conventional SPI protocol, which expects a result immediately succeeding the provision of a read command to a device being debugged. However, in accordance with examples of the present disclosure, the read-fetch command is carried out independently of subsequent publishing of the read result to the host debugger. That is, in response to a subsequent read-publish command, the debug controller 200 reports a status such as "in-progress" back to the host debugger when the read data is not yet available. This allows the host debugger to "poll" the debug controller 200 (specifically, the registration register 208 of the debug controller 200) either until valid data and a corresponding valid status are provided to the host debugger, or until a time-out or other failure status is provided. In this way, issues commonly associated with employing an SPI interface protocol for debugging where latency may exist are mitigated, while leveraging a low-cost and commonly-available external device access interface.

In some examples, the debug controller 200 may be limited to access only certain regions of the internal address space of the computing device or SoC 100. For example, certain resources of the SoC 100, such as those holding encryption keys or other sensitive information (i.e., that should not be read and/or overwritten by the debug controller 200 or any other external entity), may be associated with fuses, switches, or the like to prohibit access by an external entity. Since the debug controller 200 accesses the device being debugged 100 using its main data paths 107, the debug controller 200 is subject to permission ratification similar to any other bus master associated with the device being debugged 100. Thus, the access rights of the debug controller 200 may be limited to specific address bars by preprogramming selected fuses or switches to protect these areas from any non-secured access attempts. This provides additional security to areas associated with encryption, or those that may be subject to malware or hacking attacks, for example in an attempt to reverse engineer aspects of the device being debugged 100.

Figure 3:
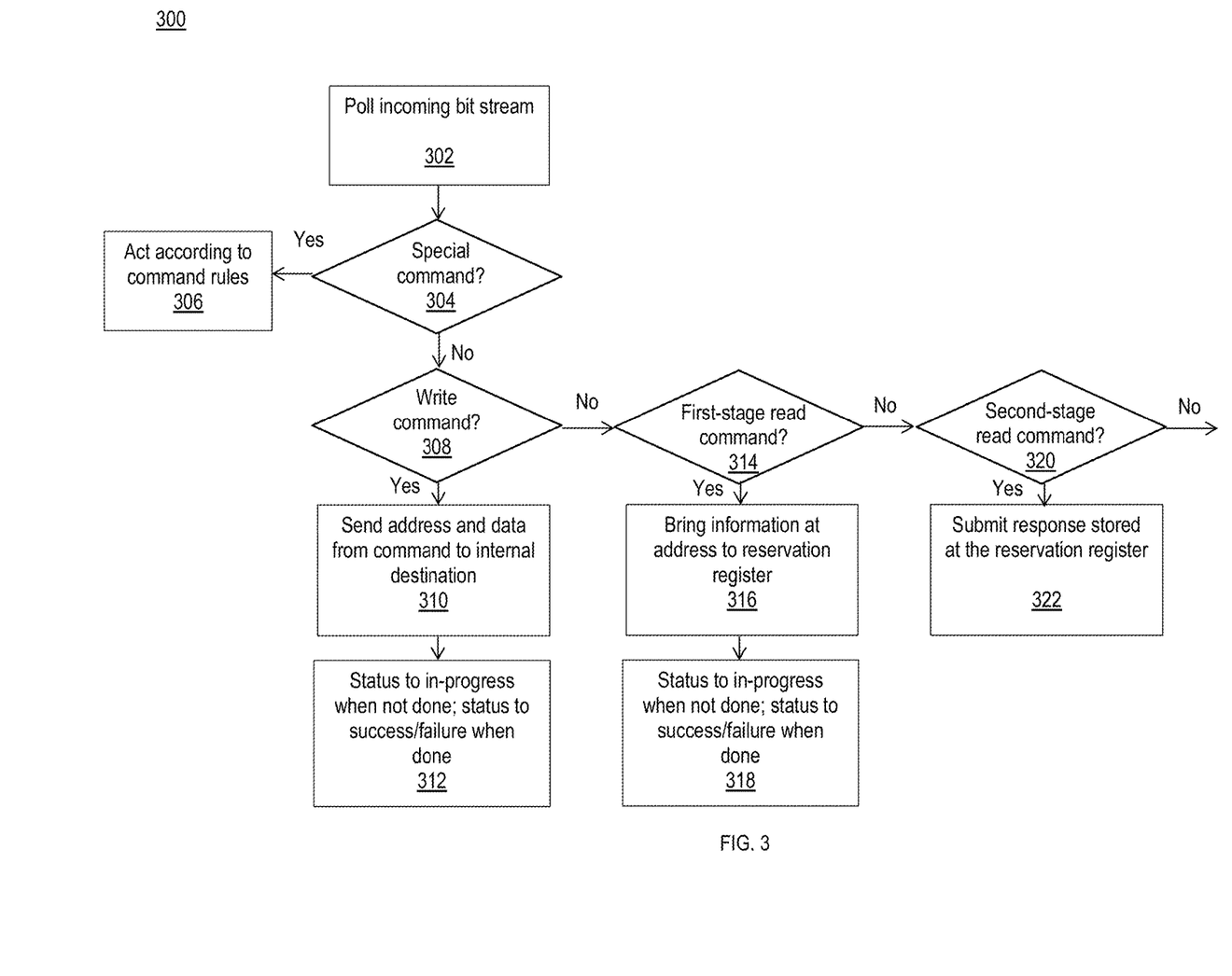
FIG. 3 shows a flow chart of a method for debugging a computing device using a debug controller in accordance with various examples of the present disclosure.

Turning now to FIG. 3, a method 300 of operating a debug controller (e.g., debug controller 200) is shown in accordance with various examples of the present disclosure. The method 300 begins in block 302 with polling an incoming bit stream. As explained above, the serial/parallel protocol converter 202, for example, receives a stream of information by way of a serial port from a host debugger 150. The stream of information, or bit stream, may include commands including an 8-byte address field, a 4-byte data field (e.g., for a write transaction), and a 2-byte command field, which represents various commands including read and write commands as described above.

The method 300 continues in block 304 with detecting whether the bit stream corresponds to a special command, such as a command to modify or alter a mode of operation of the debug controller 200. In the event that the bit stream corresponds to a special command, the method 300 continues in block 306 with acting according to the specific command rules, which may vary by command, but can include at least changing a mode of operation of the debug controller 200.

If the bit stream does not correspond to a special command, the method 300 continues in block 308 with determining whether the command is a write command. If the command is a write command, the method 300 continues in block 310 with sending data specified by the command to the address specified by the command over the main data path(s) of the computing device or SoC 100 being debugged and in block 312 with setting a status to "in-progress" when the write is not complete, and setting the status to "success" or "failure" when the write either succeeds or does not succeed (e.g., due to a time-out condition being satisfied), respectively.

If the bit stream does not correspond to a write command, the method 300 continues in block 314 with determining whether the command is a read-fetch command. If the command is a read-fetch command, the method 300 continues in block 316 with accessing data stored at the address specified by the command by way of the main data path(s) of the computing device or SoC 100 being debugged and bringing the stored data to the reservation register 208 of the debug controller 200. The method 300 then continues in block 318 with setting a status of the reservation register 208 to "in-progress" when the read has not yet completed (e.g., where the resource being accessed is far away from the debug controller 200, resulting in latency), and setting the status to "success" or "failure" when the read-fetch either succeeds in bringing the data to the reservation register 208 or does not succeed (e.g., due to a time-out condition being satisfied), respectively.

If the bit stream does not correspond to a read-fetch command, the method 300 continues in block 320 with determining whether the command is a read-publish command. If the command is a read-publish command, the method 300 continues in block 322 with publishing or providing the result stored in the reservation register 208, which may also indicate a status of the data in the reservation register 208. For example, if the read-fetch command was successful in blocks 316 and 318, then the status of the reservation register 208 data may be "successful" or "valid." However, if the read-fetch command has not yet been effected in blocks 316 and 318 (or a write command in blocks 310 and 312), then the status of the reservation register 208 may be "in-progress," indicating to the host debugger that any data received from the reservation register 208 is actually old data and should not be used (or, in the case of a prior write command, that the data has not yet been written to the SoC 100). In the event that a time-out condition is met, or another failure occurs during a previous read/write operation, the status of the reservation register 208 may indicate time-out or another failure.

In certain embodiments of the present disclosure, the value stored in the reservation register 208 may comprise one or more reserved values that correspond to a status. For example, in the case where the reservation register 208 comprises a data word, the value x0001 may correspond to "in-progress," the value x0002 may correspond to "time-out," and the value x0003 may correspond to "failure." In this example, if the data value returned by the reservation register 208 is a value other than those reserved for status indications, then the data value returned may be presumed to be valid (i.e., a status of "successful"). Of course, it should be appreciated that the above values are only exemplary; the reserved values may be selected such that those values are less likely to be actual values stored by a resource, and thus less likely to be returned as data values during a read operation. Further, in certain embodiments, the reserved values themselves may be programmable so that in the event that a previous reserved value is expected to be valid returned data value, that reserved value is reprogrammed to be a different value that is less likely to be returned in that particular context.

The method 300 may include additional blocks similar to blocks 308, 314, and 320 to decode additional commands received from a host debugger, but which are not shown presently for purposes of brevity. However, it should be appreciated that the method 300 involves decoding a command by converting the incoming bit stream received from a host debugger to an appropriately-formatted command for the SoC or computing device 100 being debugged. In certain cases, the method 300 utilizes an SPI slave interface to internally connect to the main data paths of the SoC 100 to provide the command to resources of the SoC 100.

Figure 4:
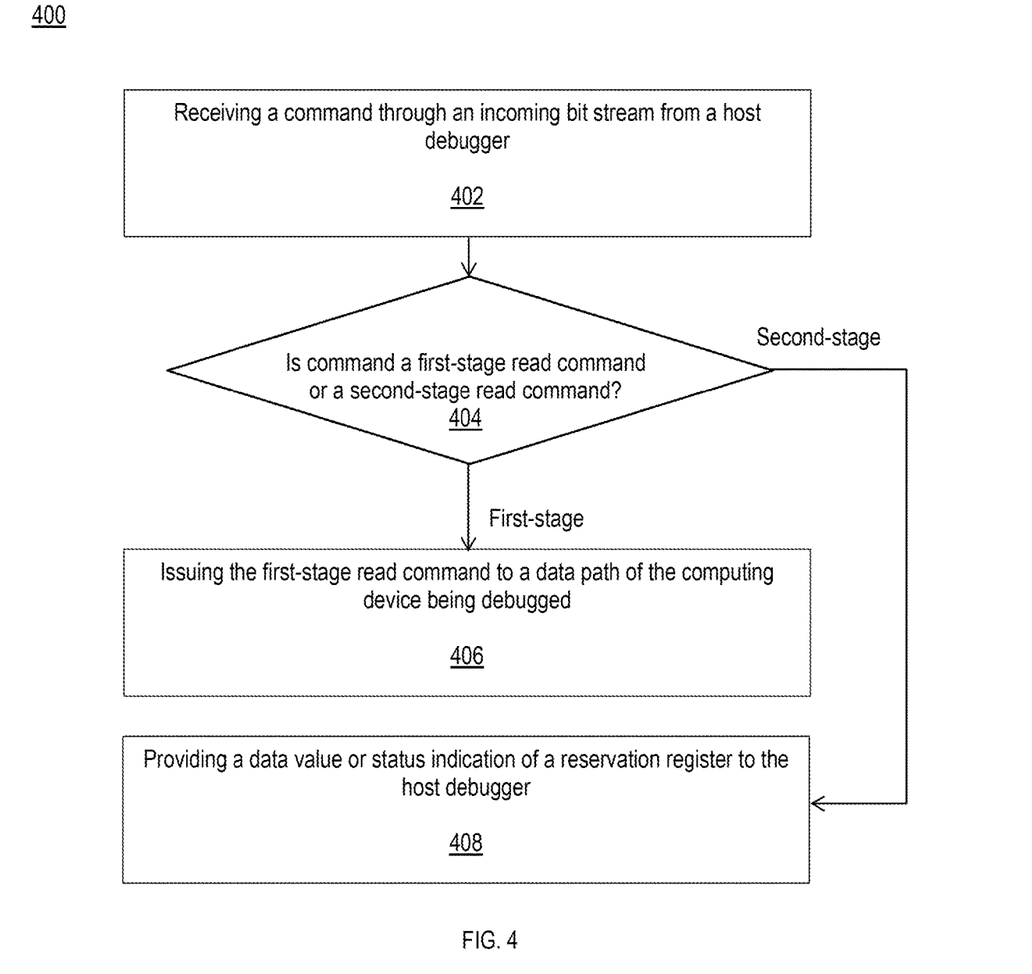
FIG. 4 shows a flow chart of another method for debugging a computing device using a debug controller in accordance with various examples of the present disclosure.

FIG. 4 shows a flow chart of another method 400 of debugging a computing device in accordance with examples of the present disclosure. The method 400 begins in block 402 with receiving a command through an incoming bit stream from a host debugger. Various commands, including read and write commands directed to internally-mapped resources of a device such as a SoC being debugged, may be received. As explained above, conventional SPI protocol suffers from an inability to tolerate latency beyond some minimal amount (i.e., read data must be ready the cycle immediately succeeding the last cycle in which the read command is supplied to the SPI slave). In accordance with various examples, the method 400 implements a two-stage read command protocol to provide an increased latency tolerance. Thus, the method 400 continues in block 404 with determining whether the command is a first-stage read command or a second-stage read command.

If the command is determined to be a first-stage read command in block 404, the method 400 continues in block 406 with issuing the first-stage read command to a data path of the computing device being debugged. If the command is determined to be a second-stage read command in block 404, the method 400 continues in block 408 with providing a data value or status indication of a reservation register to the host debugger. In the event that the first-stage read command is not immediately successful in returning the data at the resource location (e.g., due to latency), then second-stage read command results in reporting an "in-progress" status to the host debugger while no valid data has been brought into the debug controller reservation register, as explained above. Conversely, if the access to the resource location specified by the first-stage read command ends successfully (e.g., before a time-out period has been satisfied), then the second-stage read command will result in the data that was brought into the reservation register being provided to the host debugger. That is, regardless of whether the first-stage read command is immediately successful, ultimately unsuccessful, or successful after a period of latency greater than would be tolerated using the conventional SPI protocol, the method 400 provides a status indicator in response to a second-stage read command and, if read data is available, the method 400 provides the read data itself.

In general, the described systems and methods for debugging a computing device 100, such as an SoC once in production, leverage existing external access interfaces (e.g., using the SPI protocol) a common to lower-cost chips in the market today. However, unlike conventional SPI protocol, which requires strict adherence to maximum tolerable latency values, examples of the present disclosure utilize a two-stage read command protocol to provide an increased latency tolerance, while also allowing provision of a status indicator from a debug controller to a host debugger, which the host debugger may then make use of to modify a debugging flow or methodology.

The disclosed two-stage read command protocol tolerates any amount of latency during a read or write operation (subject to a time-out limit, in certain cases), and allows the host debugger to poll the debug controller and receive read data at a later time along with a status indicating that the read data received is valid. Of course, if the access ultimately fails due to a time-out or other error, the host debugger receives a status indicating that the read data is not valid and, in fact, that the read command has failed. In this event, the host debugger may be programmed to alter its debugging flow or to re-attempt the read command a certain number of times before altering its debugging flow.

Although generally described throughout with respect to read commands, which are more sensitive to computing device or SoC 100 latency, examples of the present disclosure also extend to providing status information in response to a read-publish command after a write command. For example, the host debugger may poll the debug controller by issuing a read-publish command following a write command to prompt the debug controller to provide a status indicating a successful write, a failed write, or that the write operation is still in progress.

In accordance with examples of the present disclosure, issues associated with latency in reading from a device being debugged are mitigated. In particular, the debug controller implements a two-part read command structure, where data is first brought from the SoC or computing device being debugged to the controller, and then subsequently published from the debug controller to a host debugger for example. Further, the debug controller provides a status indication in response to receiving and decoding a read-publish command that allows the host debugger to tailor a debugging flow or program to take various actions depending on the status following a read-fetch and/or write operation. The status indication being "in-progress," for example, allows the host debugger to poll the debug controller for the read data even when it is not made immediately available from the device being debugged, mitigating issues associated with latency during a read operation.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing detailed description, numerous specific details are set forth in order to provide a thorough understanding of the disclosed technologies. However, it will be understood by those skilled in the art that some embodiments may be practiced without these specific details. In other instances, well-known methods, procedures, and components have not been described in detail so as not to obscure the disclosure. Numerous variations and modifications will become apparent to those skilled in the art once the above disclosure is fully appreciated. It is intended that the following claims be interpreted to embrace all such variations and modifications.

What is claimed is:

1. A system to provide increased latency tolerance, comprising:
   a host debugger configured to carry out a debugging flow on a computing device; and
   a debug controller configured to couple the host debugger to the computing device, the debug controller comprising:
      a protocol converter configured to:
         receive an incoming bit stream from the host debugger through an interface; and
         convert the incoming bit stream into a command according to a protocol;
      a debug command decoder configured to:
         receive the command from the protocol converter;
         determine whether the command is a first-stage read command or a second-stage read command of a two-stage read command;
         as a result of a determination that the command is a first-stage read command, cause a data bus master of the debug controller to issue the first-stage read command to a main data path of the computing device; or
         as a result of a determination that the command is a second-stage read command, cause a reservation register of the debug controller to provide a data value or status indication to the host debugger through the interface;
      wherein the reservation register is configured to contain read data returned by the first-stage read command; and
      wherein the reservation register is configured to, in response to the second-stage read command:
         provide an in-progress status indication to the host debugger when, within a latency requirement of the interface, the first-stage read command has not yet returned read data from the computing device; and
         provide the read data to the host debugger when returned by the first-stage read command within the latency requirement of the interface.

2. The system of claim 1 wherein the reservation register is configured to update the status indication from in-progress to successful upon receiving the read data returned by the first-stage read command.

3. The system of claim 1 wherein the reservation register is configured to update the status indication from in-progress to time-out or failure upon a time-out condition being satisfied or upon another failure occurring in response to the first-stage read command, respectively.

4. The system of claim 1 wherein the reservation register is configured to provide the in-progress status indication to the host debugger in response to the second-stage read command after the data bus master has provided a write command to the computing device but before the write command has been carried out at the computing device.

5. The system of claim 1 wherein the data bus master is further configured to associate a debug controller transaction identification number (ID) with a command prior to providing the command to the computing device, wherein another bus master is occupying a resource to be accessed by the command, and wherein the command is carried out as a result of the transaction ID of the data bus master being different than a transaction ID of the other bus master.

6. The system of claim 1 wherein the interface comprises a Serial Peripheral Interface (SPI) and the protocol is an SPI protocol.

7. An apparatus, comprising:
   a debug command decoder configured to:
      receive first and second commands from a host debugger through an interface; and
      as a result of a determination that the first command is a first-stage read command, cause a data bus master of the debug controller to issue the first command to a data path of a computing device, wherein a reservation register of the debug controller is configured to store read data returned by the first command; and
      as a result of a determination that the second command is a second-stage read command, cause the reservation register of the debug controller to provide a data value or a status indication to the host debugger through the interface, wherein the reservation register, in response to the second command, is configured to:
         provide an in-progress status indication to the host debugger when the first command has not yet returned read data from the computing device within a latency requirement of the interface; and
         provide the read data to the host debugger when the read data is returned by the first command within the latency requirement of the interface.

8. The apparatus of claim 7 wherein the reservation register is configured to update the status indication from in-progress to successful upon receiving the read data returned by the first-stage read command.

9. The apparatus of claim 7 wherein the reservation register is configured to update the status indication from in-progress to time-out or failure upon a time-out condition being satisfied or upon another failure occurring in response to the first-stage read command, respectively.

10. The apparatus of claim 7 wherein the reservation register is configured to provide the in-progress status indication to the host debugger in response to the second-stage read command after the data bus master has provided a write command to the computing device but before the write command has been carried out at the computing device.

11. The apparatus of claim 7 wherein the data bus master is further configured to associate a debug controller transaction identification number (ID) with a command prior to providing the first command to the computing device, wherein another bus master is occupying a resource to be accessed by the first command, and wherein the first command is carried out as a result of the transaction ID of the data bus master being different than a transaction ID of the other bus master.

12. The apparatus of claim 7 wherein the debug command decoder is further configured to determine whether the first or second command is a command to change a mode of operation of the debug controller and, as a result of a determination that the first or second command is a special command to change the mode of operation of the debug controller, cause the debug controller to change one or more parameters of the debug controller.

13. The apparatus of claim 7 wherein the interface comprises a Serial Peripheral Interface (SPI) and the apparatus further comprising a protocol converter configured to convert an incoming bit stream to the first and second commands according to an SPI protocol.

14. A method of increasing latency tolerance while debugging a computing device, comprising:
receiving a command through an incoming bit stream from a host debugger over an interface;
determining whether the command is a first-stage read command or a second-stage read command;
if the command is a first-stage read command, issuing the first-stage read command to a data path of the computing device; or
if the command is a second-stage read command, providing a data value or status indication of a reservation register to the host debugger within a latency requirement of the interface.

15. The method of claim 14, wherein the command is a second-stage read command, the method further comprising, in response to the second-stage read command:
providing an in-progress status indication to the host debugger indicating that a previous first-stage read command has not yet returned read data from the computing device; and
after the read data has been returned by the previous first-stage read command, providing the read data to the host debugger.

16. The method of claim 14, wherein the command is a second-stage read command and the status indication is an in-progress status indication, the method further comprising:
receiving read data returned by a previous first-stage read command; and
providing to the host debugger a successful status indication.

17. The method of claim 14, wherein the command is a second-stage read command and the status indication is an in-progress status indication, the method further comprising:
providing to the host debugger a time-out status indication upon a time-out condition being satisfied; or
providing to the host debugger a failure status indication upon a failure occurring in response to a previous first-stage read command.

18. The method of claim 14, wherein the command is a second-stage read command, the method further comprising providing an in-progress status indication to the host debugger in response to the second-stage read command after providing a write command to the computing device but before the write command has been carried out at the computing device.

19. The method of claim 14, wherein the command has an associated debug controller transaction identification number (ID) for prioritizing the command relative to another command.

20. The method of claim 14 wherein the computing device comprises a system on a chip (SoC).

* * * * *